(12) United States Patent
Yuan

(10) Patent No.: US 12,046,936 B2
(45) Date of Patent: Jul. 23, 2024

(54) FAST CHARGER WITH STRESS RELIEVING FUNCTION

(71) Applicant: Jing Yuan, Shenzhen (CN)

(72) Inventor: Jing Yuan, Shenzhen (CN)

( * ) Notice: Subject to any disclaimer, the term of this patent is extended or adjusted under 35 U.S.C. 154(b) by 0 days.

(21) Appl. No.: 18/518,845

(22) Filed: Nov. 24, 2023

(65) Prior Publication Data
US 2024/0088684 A1 Mar. 14, 2024

(51) Int. Cl.
*H02J 7/00* (2006.01)
*A63H 33/26* (2006.01)
*A63H 5/00* (2006.01)

(52) U.S. Cl.
CPC ............ *H02J 7/0042* (2013.01); *A63H 33/26* (2013.01); *A63H 5/00* (2013.01)

(58) Field of Classification Search
None
See application file for complete search history.

(56) References Cited

U.S. PATENT DOCUMENTS

| 2009/0085530 A1* | 4/2009 | Matsubara | F03G 5/06 290/1 R |
| 2009/0108590 A1* | 4/2009 | Mabuchi | F03G 5/06 290/1 R |

* cited by examiner

*Primary Examiner* — Robert Grant
(74) *Attorney, Agent, or Firm* — Daniel M. Cohn; Howard M. Cohn

(57) ABSTRACT

The fast charger with a stress relieving function includes a charger body, configured to connect a power supply for charging an electronic product; a button I, where the button I is movably disposed on a side of the charger body, the button I is in a shape of a boat, and when one end of the button I is pressed, the other end of the button I is raised; a button II, where the button II is disposed on a side, away from the button I, of the charger body; and at least two rotary buttons. A stress relieving product is integrated into the charger. Therefore, charging can be performed or stress can be relieved. The connection base, the baffle plate II, and the baffle plate II are disposed inside the charger body, to completely isolate a stress relieving structure from a circuit structure inside the charger, to enable these structures not interfere with each other.

8 Claims, 7 Drawing Sheets

FAST CHARGER WITH STRESS RELIEVING FUNCTION

TECHNICAL FIELD

The present disclosure relates the technical field of chargers, in particular to a fast charger with a stress relieving function.

BACKGROUND

A charger of an electronic product roughly includes a travel charger, a seating-type charger, and a maintenance charger. A user is generally contact with the travel charger and the seating-type charger. The most sold on the market are travel chargers and fast chargers that support fast charging protocols, such as a PD protocol, a QC protocol, a AFC protocol, and a AFC protocol. This effectively improves a charging speed. A stress relieving product is usually a toy that is played by person under stress.

At present, while stress of person is increased, popularity rate of the stress relieving product is more popular. However, the stress relieving product is idle most of the time. A user may use the stress relieving product at a moment in daily life, or may not use the stress relieving product for a day or a few days. Therefore, the stress relieving product has a problem in carrying. The stress relieving product takes up storage space when being not used, or is not carried when being required. If the stress relieving product is left unused for a long time, it is easy to be lost. This brings serious troubles to the user. The charger and the stress relieving product has a same volume. With the increase in frequency of a mobile phone in use, the charger has become a necessity for persons to carry every day. However, an existing charger has a single function and cannot be combined with the stress relieving product. Therefore, using effect is poor.

SUMMARY

To achieve the foregoing objective, the present disclosure provides the following technical solutions. A fast charger with a stress relieving function includes:
- a charger body, configured to connect a power supply for charging an electronic product;
- button I, wherein the button I is movably disposed on a side of the charger body, the button I is in a shape of a boat, and when one end of the button I is pressed, the other end of the button I is turned up;
- a button II, wherein the button II is disposed on a side, away from the button I, of the charger body; and
- at least two rotary buttons, wherein the two rotary buttons are respectively disposed on two opposite surfaces of the charger body.

As a preferred technical solution of the present disclosure, the charger body includes a charger shell and a bottom cover of the charger that is disposed on one end of the charger shell, a folding pin is movably disposed inside the bottom cover of the charger, and a fast charging PCB is disposed inside the charger shell.

As a preferred technical solution of the present disclosure, a base that is used to mount the button I is disposed inside the charger shell, short shafts are disposed on two sides of the button I, and the two short shafts are movably sleeved with two sides of an inner wall of the base respectively.

As a preferred technical solution of the present disclosure, two metal columns are symmetrically disposed inside the base, and two magnetic sheets that are respectively corresponding to the two metal columns are embedded inside the button I.

As a preferred technical solution of the present disclosure, a baffle plate I is disposed inside the base, a support skeleton is disposed on a side of the baffle plate I, the button II is located on a side of the support skeleton, there is at least one button II, and a plurality of buttons II are connected together by using a connection rib.

As a preferred technical solution of the present disclosure, the support skeleton is internally provided with clamping grooves of which quantity is the same as that of the buttons II, and the plurality of the clamping grooves and the buttons II are in a one-to-one correspondence.

As a preferred technical solution of the present disclosure, connection bases are disposed on two sides of an inner wall of the charger shell, one end of the rotary button extends inside the connection bases, a buckle is disposed at the one end of the rotary button, a support column of which one end extends inside the charger shell, and one end, away from the rotary button, of the support column is tapered.

As a preferred technical solution of the present disclosure, a baffle plate II that is located on a side of a base is disposed inside the bottom cover of the charger, and a limiting groove that is used to mount the base is disposed on a side of the baffle plate II.

As a preferred technical solution of the present disclosure, a pin mounting base is further disposed inside the bottom cover of the charger, a pin groove is disposed on a side, away from the charger shell, of the bottom cover of the charger, one end of the folding pin extends inside the pin groove, a clamp is disposed inside the pin mounting base, and a rotating shaft that is movably sleeved with the clamp is disposed inside the folding pin.

As a preferred technical solution of the present disclosure, a contact dome of which one end is welded and fastened to the fast charging PCB is disposed inside the pin mounting base, the one end of the folding pin abuts against the contact dome, a charging port is provided on the fast charging PCB, and a through hole corresponding to the charging port is provided inside the bottom cover of the charger.

Compared with the prior art, the fast charger with a stress relieving function provided in the present disclosure has the following beneficial effect:

According to the fast charger with a stress relieving function, the stress relieving product is integrated into the charger. Therefore, charging can be performed or stress can be relieved. This resolves a problem that functions of a conventional stress relieving product and a charger are single, and resolves problems that the stress relieving product is rarely used, is easy to lose when idle, and is not available for use without carrying. The connection base, the baffle plate II, and the baffle plate II are disposed inside the charger body, to completely isolate a stress relieving structure from a circuit structure inside the charger, to enable these structures not interfere with each other. This effectively improves safety and stability of the charger in use.

Figure 1:
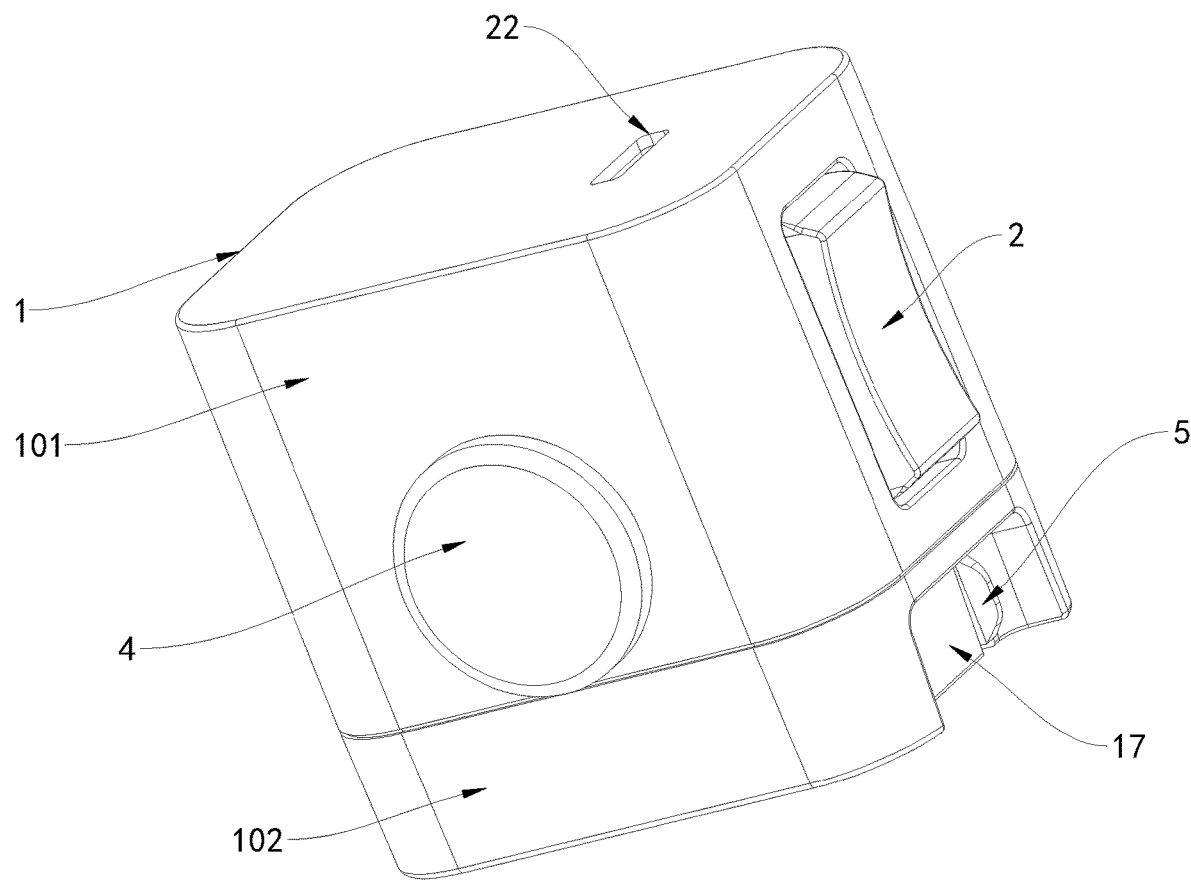
FIG. 1 is a schematic diagram of a structure of a fast charger with a stress relieving function according to the present disclosure.

Reference numerals: 1. charger body; 101. charger shell; 102. bottom cover of charger; 2. button I; 201. short shaft; 3. button II; 301. connection rib; 4. rotary button; 401. buckle; 402. support column; 5. folding pin; 6. fast charging PCB; 7. base; 8. metal column; 9. magnetic sheet; 10. baffle plate I; 11. support skeleton; 12. clamping groove; 13. connection base; 14. baffle plate II; 15. limiting groove; 16. pin mounting base; 17. pin groove; 18. clamp; 19. rotating shaft; 20. contact dome; 21. charging port; 22. through hole.

DETAILED DESCRIPTION OF THE EMBODIMENTS

The technical solutions in embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on embodiments of the present disclosure without creative efforts should fall within the protection scope of the present disclosure.

Refer to FIG. 1 to FIG. 9. A fast charger with a stress relieving function includes a charger body 1, a button I 2, a button II 3, and at least two rotary buttons 4. The charger body 1 is configured to connect a power supply for charging an electronic product.

Figure 2:
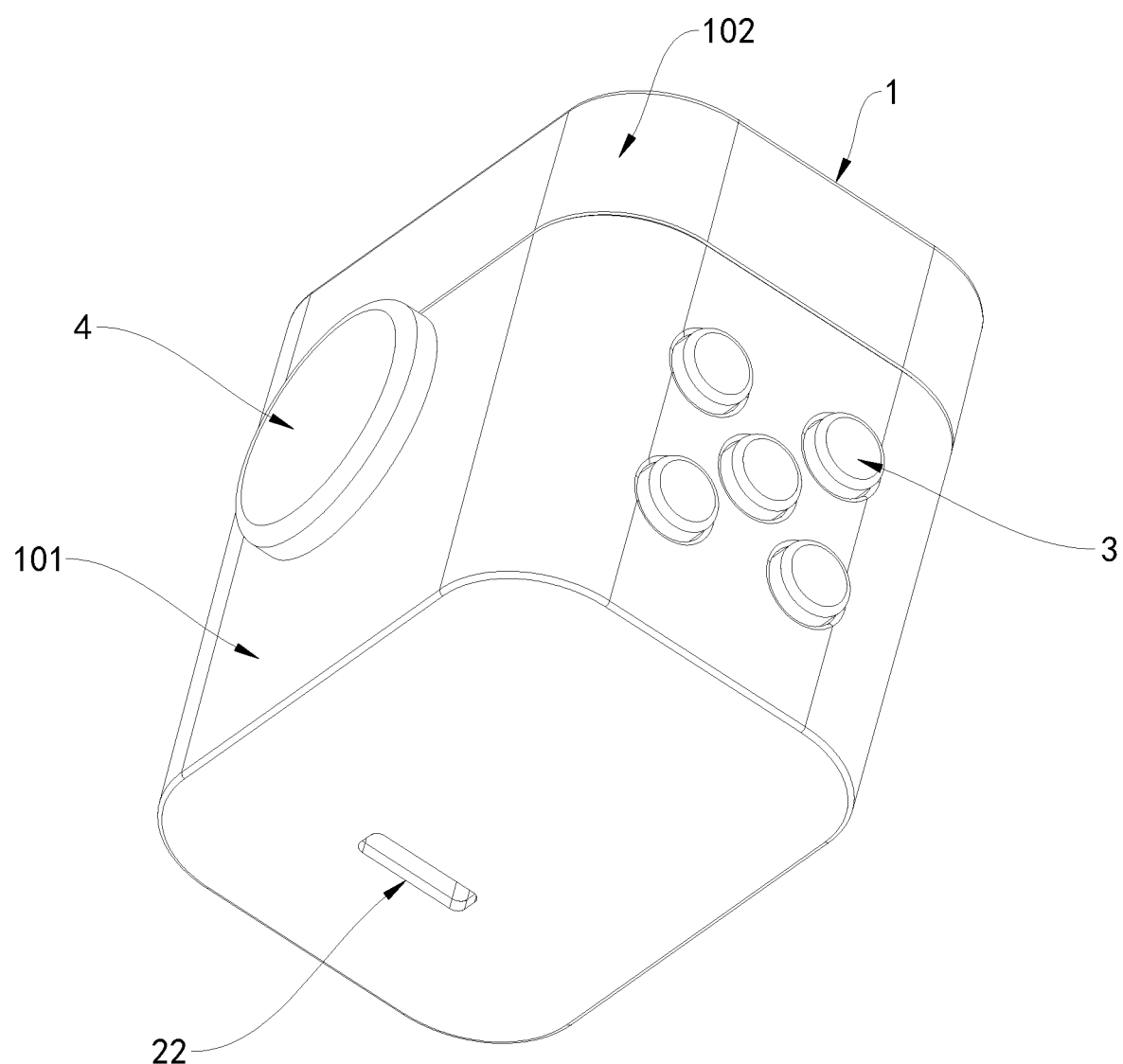
FIG. 2 is a side view of a structure of a fast charger with a stress relieving function according to the present disclosure according to the present disclosure.
Figure 3:
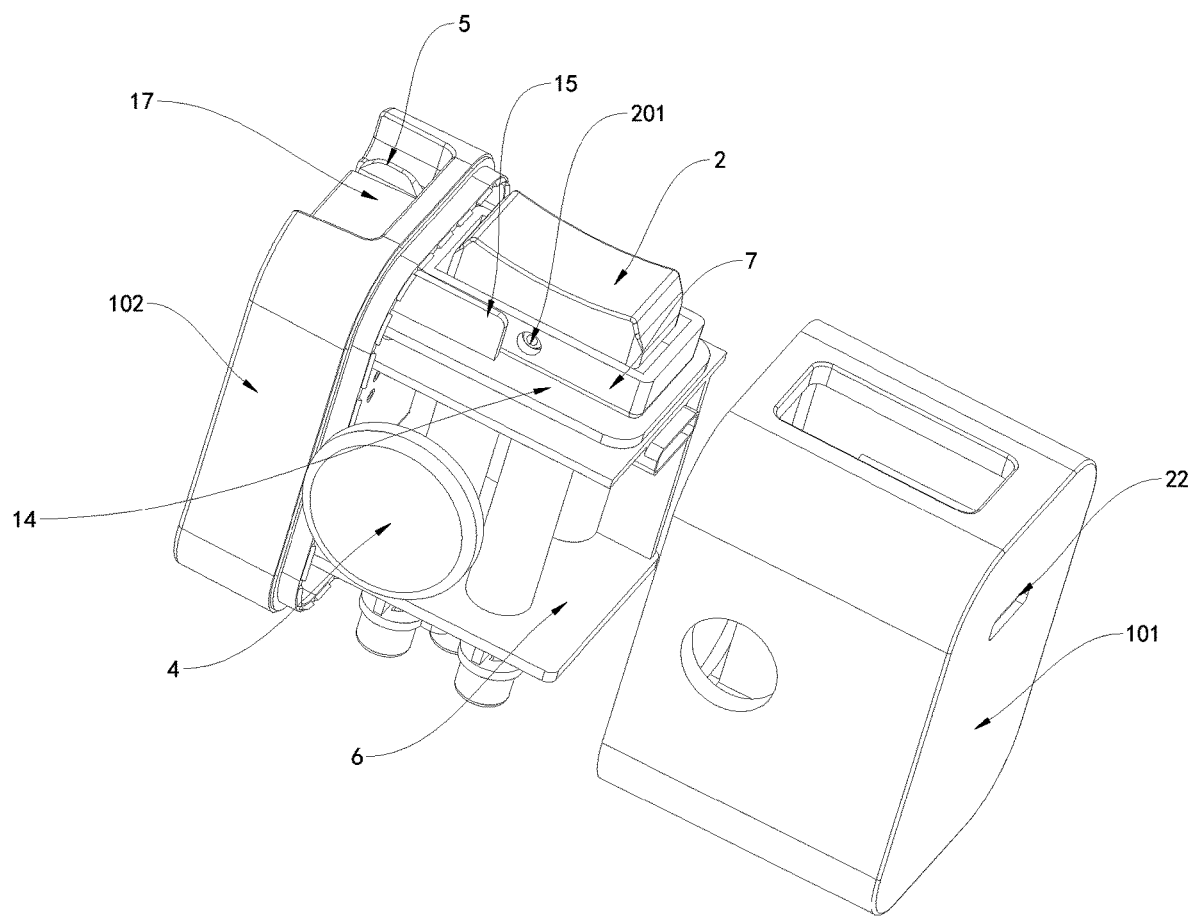
FIG. 3 is a schematic diagram of a status that a charger shell is separated from a bottom cover of a fast charger with a stress relieving function according to the present disclosure.
Figure 4:
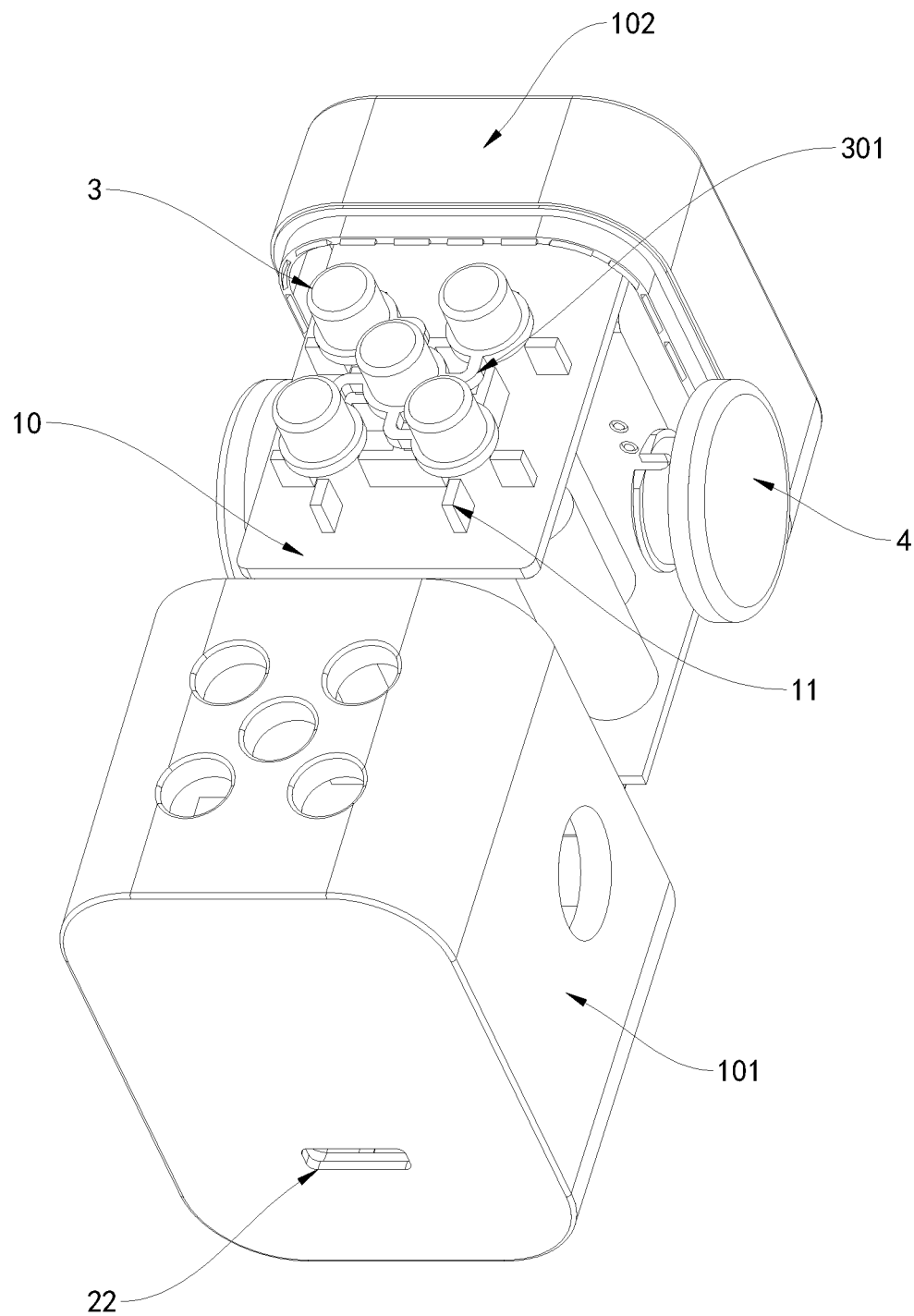
FIG. 4 is a schematic diagram of a status that a charger shell is separated from a bottom cover of a charger of a fast charger with a stress relieving function according to the present disclosure.
Figure 5:
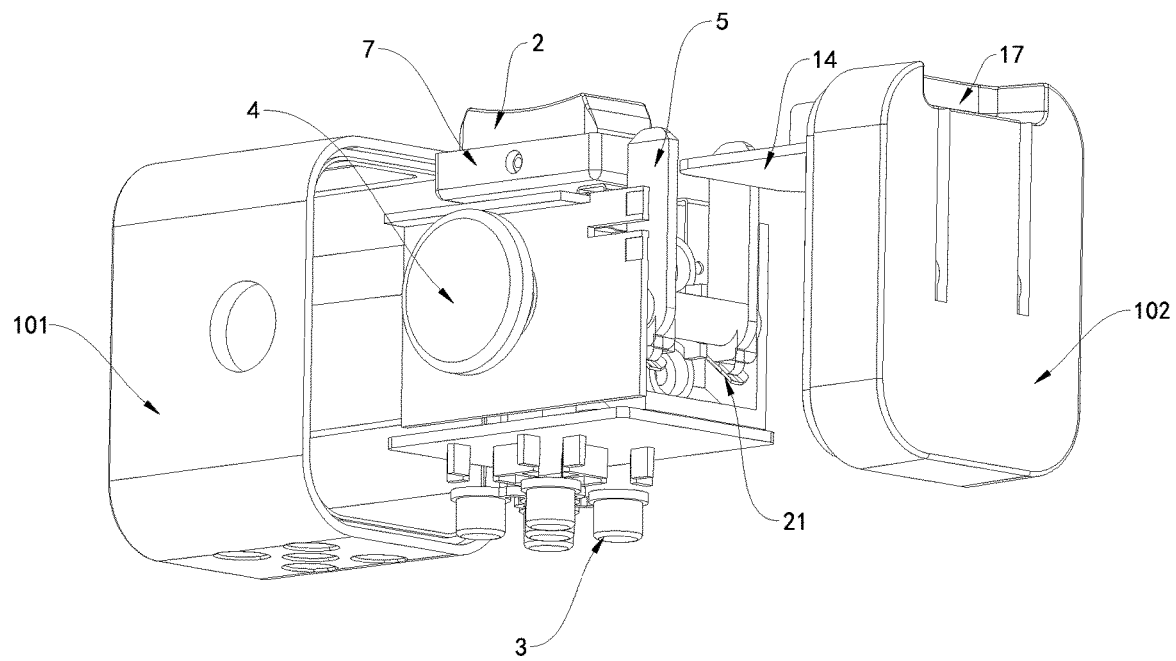
FIG. 5 is a schematic diagram of a status that a bottom cover of a charger is separated from a pin mounting base of a fast charger with a stress relieving function according to the present disclosure.
Figure 6:
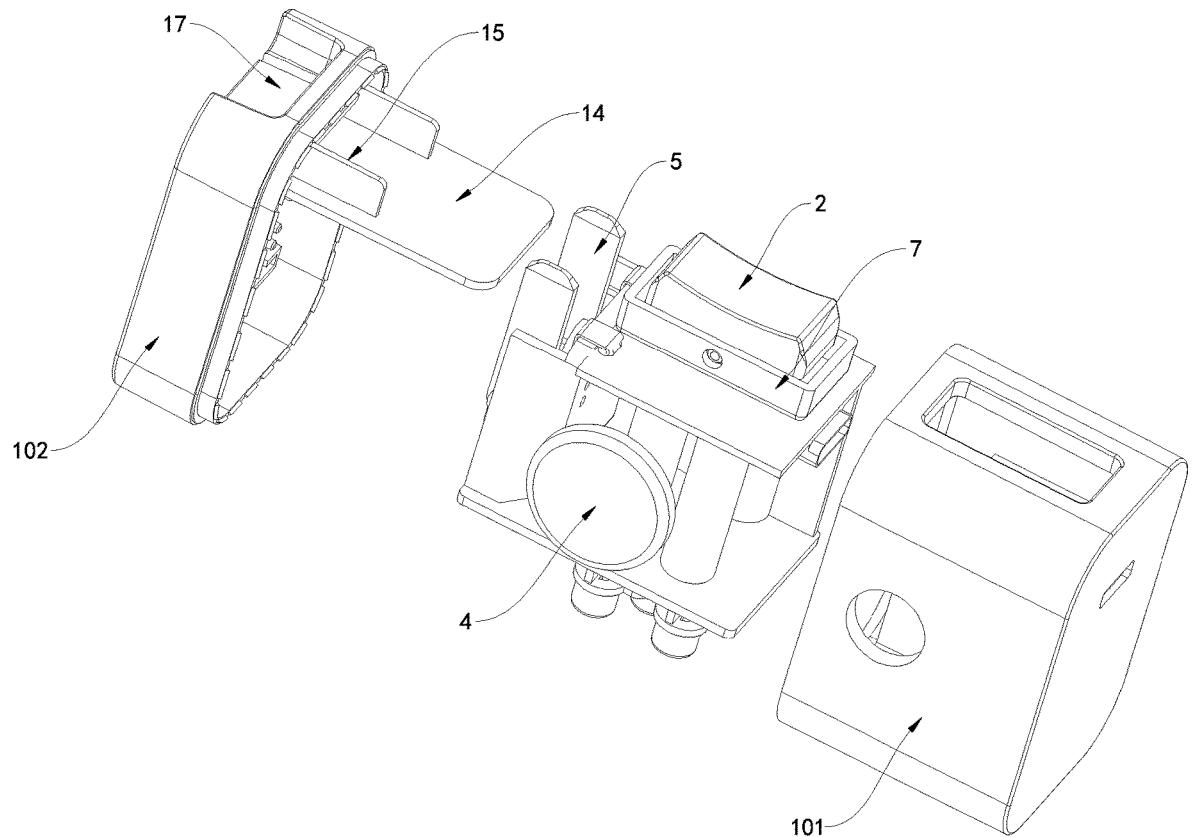
FIG. 6 is a schematic diagram of a status that a bottom cover of a charger is separated from a pin mounting base of a fast charger with a stress relieving function according to the present disclosure.

The button I 2 is movably disposed on a side of the charger body 1, the button I 2 is in a shape of a boat, and when one end of the button I 2 is pressed, the other end of the button I 2 is turned up. As shown in FIG. 1 and FIG. 2, a user performs stress relieving by repeatedly pressing two ends of the button I 2 with a finger.

The button II 3 is disposed on a side, away from the button I 2, of the charger body 1. As shown in FIG. 1 and FIG. 2, the button II 3 is a circular piece, and the user may perform stress relieving by repeatedly pressing the button II 3.

The at least two rotary buttons 4 are respectively disposed on two opposite surfaces of the charger body 1. As shown in FIG. 1 and FIG. 2, when the two rotary buttons 4 are used for stress relieving, the charger body 1 may be rotated by pinching the two rotary buttons 4.

As a specific technical solution in this embodiment, the charger body 1 includes a charger shell 101 and a bottom cover 102 of the charger that is disposed on one end of the charger shell 101, a folding pin 5 is movably disposed inside the bottom cover 102 of the charger, and a fast charging PCB 6 is disposed inside the charger shell 101. The charger shell 101 is clamped with the bottom cover 102 of the charger, and the folding pin 5 is used to connect to a power socket.

A base 7 that is used to mount the button I 2 is disposed inside the charger shell 101, short shafts 201 are disposed on two sides of the button I 2, and the two short shafts 201 are movably sleeved with two sides of an inner wall of the base 7 respectively. Two metal columns 8 are symmetrically disposed inside the base 7, and two magnetic sheets 9 that are respectively corresponding to the two metal columns 8 are embedded inside the button I 2. As shown in FIG. 1 and FIG. 2, when an end of the button I 2 is pressed, the button I 2 rotates with the short shaft 201 as a center of a circle. When the end of the button I 2 descends and sinks inside the base 7, the magnetic sheet 9 inside the base 7 is adsorbed with the metal column 8, to remain the pressed button I 2 stable.

When the user presses the upturned end of the button I 2, the magnetic sheet 9 and the metal column 8 that are adsorbed together cause a specific resistance to pressing. Therefore, when the user presses the upturned end of the button I 2 with a larger force, the magnetic sheet 9 and the metal column 8 that are absorbed at the other end are separated instantly, and the magnetic sheet 9 inside the pressed end hits the metal column 8. In addition, a crisp ringing sound is made, to improve stress relieving effect.

As a specific technical solution in this embodiment, a baffle plate I 10 is disposed inside the base 7, a support skeleton 11 is disposed on a side of the baffle plate I 10, the button II 3 is located on a side of the support skeleton 11, there is at least one button II 3, and a plurality of buttons II 3 are connected together by using a connection rib 301. The support skeleton 11 is internally provided with clamping grooves 12 of which quantity is the same as that of the buttons II 3, and the plurality of the clamping grooves 12 and the buttons II 3 are in a one-to-one correspondence. The clamping groove 12 is used to install a spring. After the spring is mounted inside the clamping groove 12, when the button II 3 is pressed, the button II 3 compresses the spring, and when the user releases the button II 3, the spring rebounds against the button II 3, to reset the button II 3. Therefore, the button II 3 may be pressed repeatedly. Due to disposing of the clamping groove 12, stability of the spring is ensured. Due to setting of the support skeleton 11, stability of the button II 3 is ensured during pressing.

Figure 7:
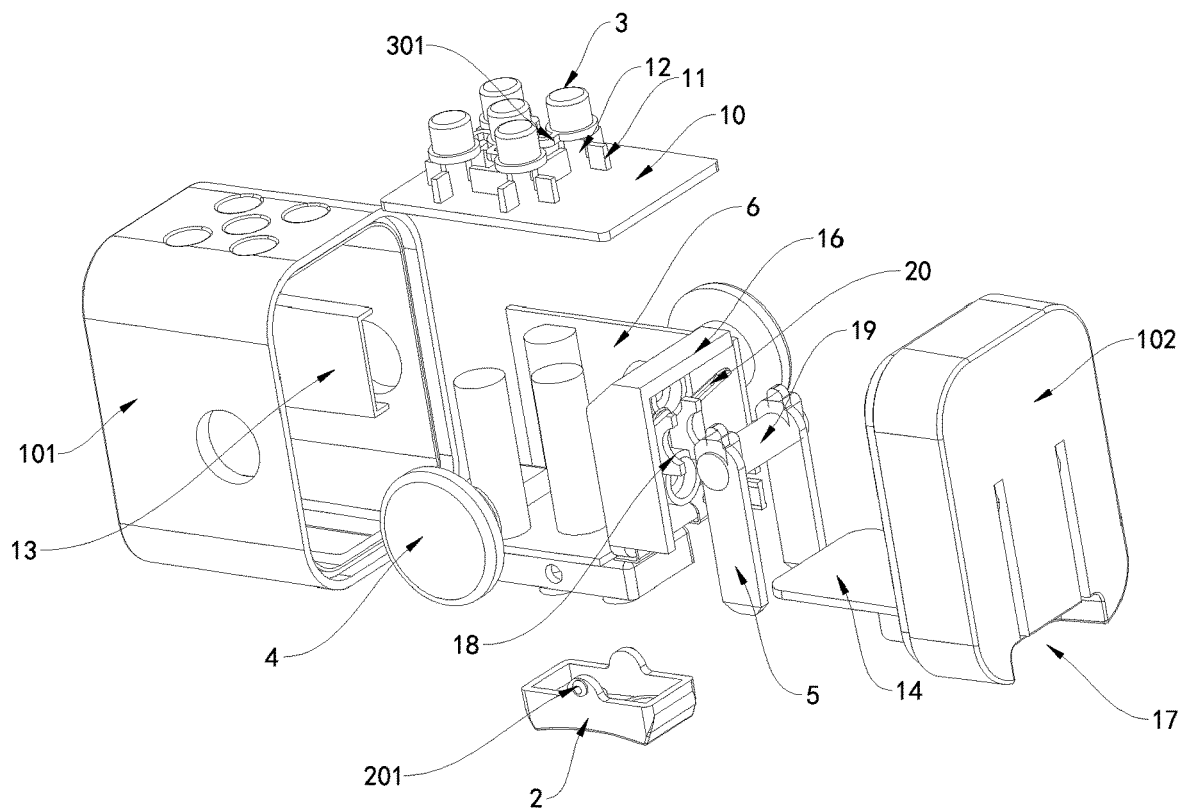
FIG. 7 is an exploded view of a structure of a fast charger with a stress relieving function according to the present disclosure.
Figure 8:
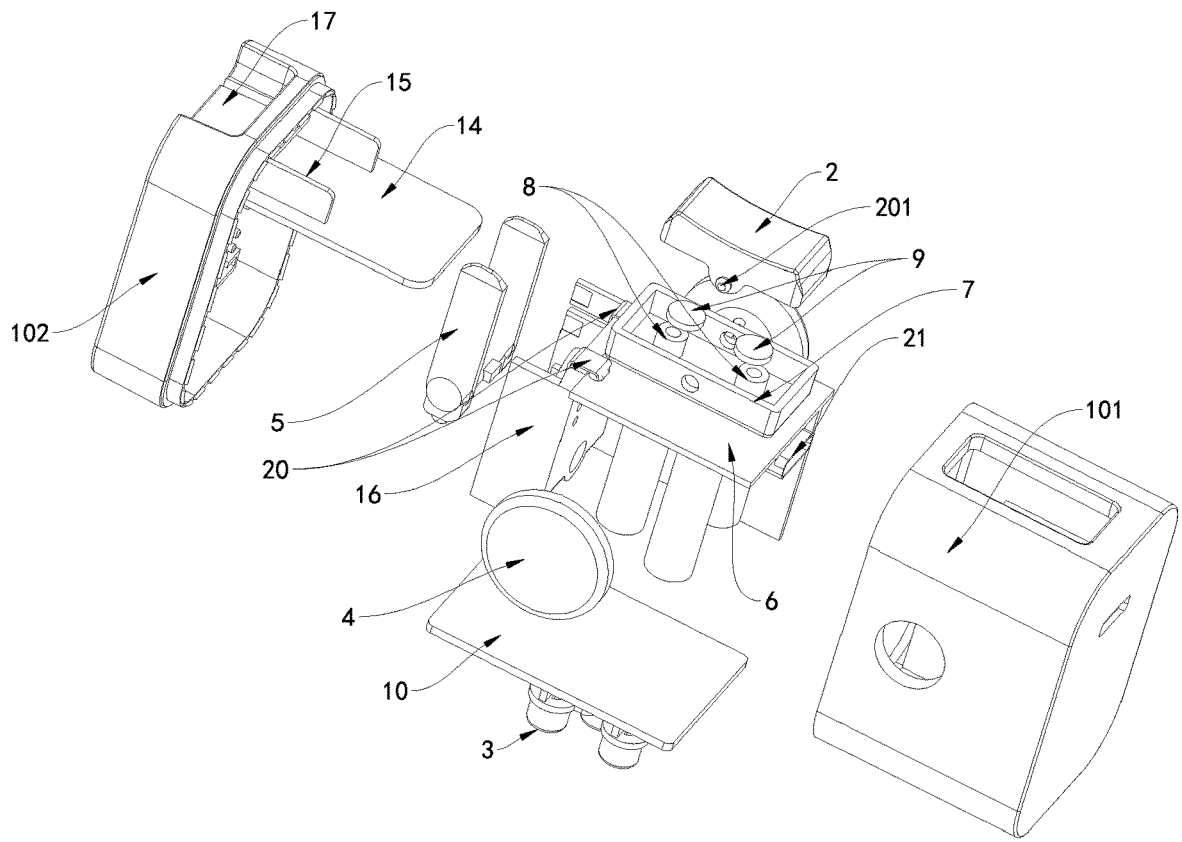
FIG. 8 is an exploded view of a structure of a fast charger with a stress relieving function according to the present disclosure.
Figure 9:
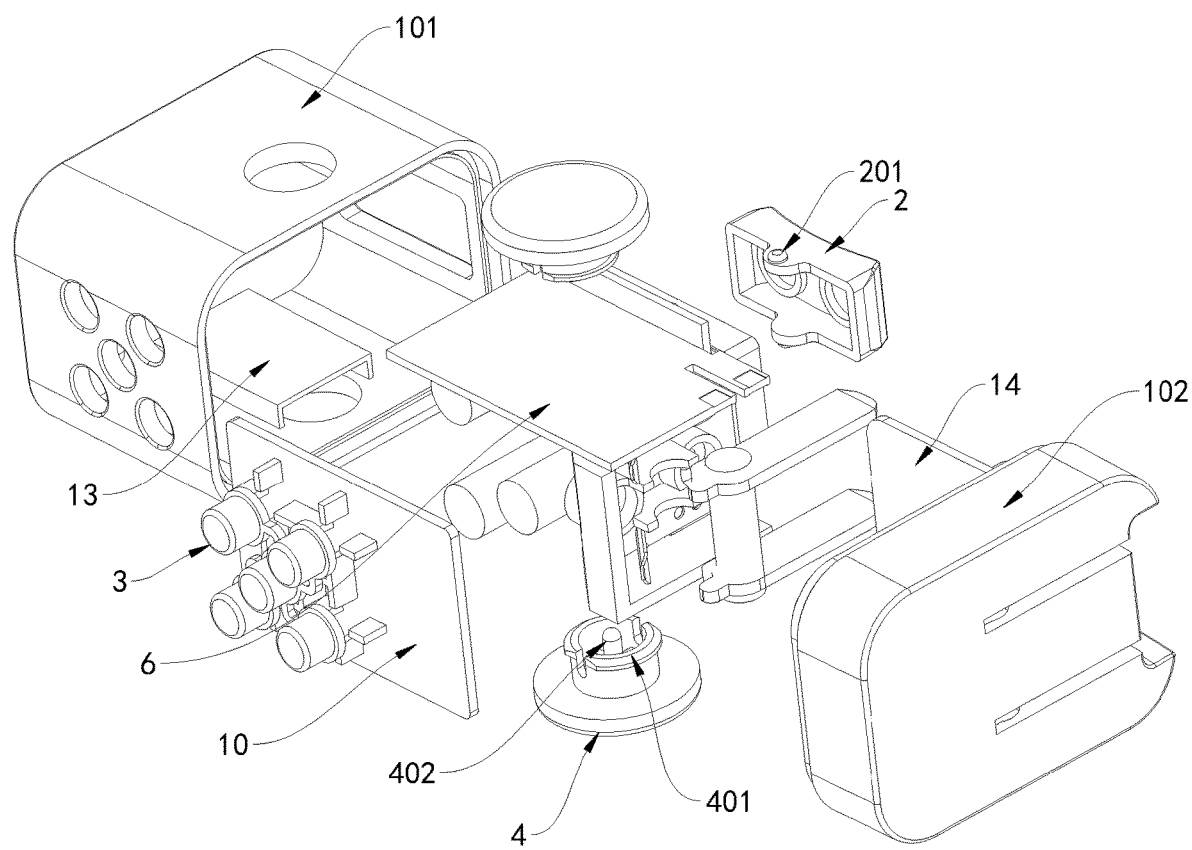
FIG. 9 is a schematic view of a structure of a rotary button of a fast charger with a stress relieving function according to the present disclosure.

As a specific technical solution in this embodiment, connection bases 13 are disposed on two sides of an inner wall of the charger shell 101, one end of the rotary button 4 extends inside the connection bases 13, a buckle 401 is disposed at the one end of the rotary button 4, a support column 402 of which one end extends inside the charger shell 101, and one end, away from the rotary button 4, of the support column 402 is tapered. As shown in FIG. 7 and FIG. 9. The connection base 13 is used to limit and support a pressing distance of the rotary button 4. Therefore, when the rotary button 4 is pressed, the support column 402 does not cause damage to the fast charging PCB 6 disposed inside the charger body 1. As shown in FIG. 9, because the one end of the support column 402 is tapered, when the support column 402 abuts against the inner wall of the connection base 13, contact area is reduced, so that the charger body 1 rotates more smoothly, without being stuck.

As a specific technical solution in this embodiment, a baffle plate II 14 that is located on a side of a base 7 is disposed inside the bottom cover 102 of the charger, and a limiting groove 15 that is used to mount the base 7 is disposed on a side of the baffle plate II 14. Because the base 7 is isolated from the fast charging PCB 6 inside the charger body 1 by using the baffle plate II 14, interaction influences are reduced. The base 7 is limited by using the limiting groove 15, and this further ensures stability of the base 7 and the button I 2.

As a specific technical solution in this embodiment, a pin mounting base 16 is further disposed inside the bottom cover 102 of the charger, a pin groove 17 is disposed on a side, away from the charger shell 101, of the bottom cover 102 of the charger, one end of the folding pin 5 extends inside the pin groove 17, a clamp 18 is disposed inside the pin mounting base 16, and a rotating shaft 19 that is movably sleeved with the clamp 18 is disposed inside the folding pin 5. A contact dome 20 of which one end is welded and fastened to the fast charging PCB 6 is disposed inside the pin mounting base 16. When the folding pin 5 is used, the folding pin 5 is flipped through the pin groove 17, the folding pin 5 drives the rotating shaft 19 to rotate inside the clamp 18, the folding pin 5 abuts against the contact dome 20 for bending, and the contact dome 20 continuously applies a resisting force on the folding pin 5. This ensures stability of the folding pin 5 after the folding pin 5 is flipped and when the folding pin 5 is accommodated.

As a specific technical solution in this embodiment, the one end of the folding pin 5 abuts against the contact dome 20, a charging port 21 is provided on the fast charging PCB 6, and a through hole 22 corresponding to the charging port 21 is provided inside the bottom cover 102 of the charger. One end of a charging cable is connected to the charging port 21 through the through hole 22, and then the other end of the charging cable is connected to a port of the electronic product. The electronic product is charged after the charger body 1 is plugged into the power socket.

In conclusion, due to the fast charger with a stress relieving function, a stress relieving product is integrated into the charger. Therefore, charging can be performed or stress can be relieved. This resolves a problem that functions of a conventional stress relieving product and a charger are single, and resolves problems that the stress relieving product is rarely used, is easy to lose when idle, and is not available for use without carrying. The connection base 13, the baffle plate II 14, and the baffle plate I 10 are disposed inside the charger body 1, to completely isolate a stress relieving structure from a circuit structure inside the charger, to enable these structures not interfere with each other. This effectively improves safety and stability of the charger in use.

It should be noted that terms "including", "comprising", or any other variants thereof are intended to cover non-exclusive inclusion, such that a process, method, article, or device including a series of elements includes not only those elements but also other elements not explicitly listed, or elements inherent to such a process, method, article, or device. In case there are no more restrictions, an element limited by the statement "including a . . . " does not exclude the presence of additional identical elements in the process, the method, the article, or the device that includes the element.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

The invention claimed is:

1. A fast charger with a stress relieving function, comprising:
    a charger body (1), configured to connect a power supply for charging an electronic product;
    button I (2), wherein the button I (2) is movably disposed on a side of the charger body (1), the button I (2) is in a shape of a boat, and when one end of the button I (2) is pressed, the other end of the button I (2) is turned up;
    a button II (3), wherein the button II (3) is disposed on a side, away from the button I (2), of the charger body (1); and
    at least two rotary buttons (4), wherein the two rotary buttons (4) are respectively disposed on two opposite surfaces of the charger body (1);
    a charger body (1) comprises a charger shell (101) and a bottom cover (102) of the charger that is disposed on one end of the charger shell (101), a folding pin (5) is movably disposed inside the bottom cover (102) of the charger, and a fast charging PCB (6) is disposed inside the charger shell (101);
    a base (7) that is used to mount the button I (2) is disposed inside the charger shell (101), short shafts (201) are disposed on two sides of the button I (2), and the two short shafts (201) are movably sleeved with two sides of an inner wall of the base (7) respectively.

2. The fast charger with a stress relieving function according to claim 1, wherein two metal columns (8) are symmetrically disposed inside the base (7), and two magnetic sheets (9) that are respectively corresponding to the two metal columns (8) are embedded inside the button I (2).

3. The fast charger with a stress relieving function according to claim 2, wherein a baffle plate I (10) is disposed inside the base (7), a support skeleton (11) is disposed on a side of the baffle plate I (10), the button II (3) is located on a side of the support skeleton (11), there is at least one button II (3), and a plurality of buttons II (3) are connected together by using a connection rib (301).

4. The fast charger with a stress relieving function according to claim 3, wherein the support skeleton (11) is internally provided with clamping grooves (12) of which quantity is the same as that of the buttons II (3), and the plurality of the clamping grooves (12) and the buttons II (3) are in a one-to-one correspondence.

5. The fast charger with a stress relieving function according to claim 1, wherein connection bases (13) are disposed on two sides of an inner wall of the charger shell (101), one end of the rotary button (4) extends inside the connection bases (13), a buckle (401) is disposed at the one end of the rotary button (4), a support column (402) of which one end extends inside the charger shell (101), and one end, away from the rotary button (4), of the support column (402) is tapered.

6. The fast charger with a stress relieving function according to claim 5, wherein a baffle plate II (14) that is located on a side of a base (7) is disposed inside the bottom cover (102) of the charger, and a limiting groove (15) that is used to mount the base (7) is disposed on a side of the baffle plate II (14).

7. The fast charger with a stress relieving function according to claim 6, wherein a pin mounting base (16) is further disposed inside the bottom cover (102) of the charger, a pin groove (17) is disposed on a side, away from the charger shell (101), of the bottom cover (102) of the charger, one end of the folding pin (5) extends inside the pin groove (17), a clamp (18) is disposed inside the pin mounting base (16), and a rotating shaft (19) that is movably sleeved with the clamp (18) is disposed inside the folding pin (5).

8. The fast charger with a stress relieving function according to claim 7, wherein
   a contact dome (20) of which one end is welded and fastened to the fast charging PCB (6) is disposed inside the pin mounting base (16), the one end of the folding pin (5) abuts against the contact dome (20), a charging port (21) is provided on the fast charging PCB (6), and a through hole (22) corresponding to the charging port (21) is provided inside the bottom cover (102) of the charger.

* * * * *